United States Patent
Tierny

(10) Patent No.: US 9,326,534 B2
(45) Date of Patent: May 3, 2016

(54) BEET PROCESSING PROCESS AND UNIT

(75) Inventor: Jean-Benoit Tierny, Arras (FR)

(73) Assignee: Lesaffre Et Comopagnie, Paris (FR)

( * ) Notice: Subject to any disclaimer, the term of this patent is extended or adjusted under 35 U.S.C. 154(b) by 369 days.

(21) Appl. No.: 12/933,102

(22) PCT Filed: Mar. 19, 2009

(86) PCT No.: PCT/FR2009/000296
§ 371 (c)(1),
(2), (4) Date: Oct. 22, 2010

(87) PCT Pub. No.: WO2009/125088
PCT Pub. Date: Oct. 15, 2009

(65) Prior Publication Data
US 2011/0039011 A1 Feb. 17, 2011

(30) Foreign Application Priority Data

Mar. 19, 2008 (FR) ...................................... 08 01496

(51) Int. Cl.
*A23K 1/14* (2006.01)
*A23K 1/18* (2006.01)
*A23K 3/00* (2006.01)
*A23L 1/09* (2006.01)
*C13B 10/08* (2011.01)

(52) U.S. Cl.
CPC .............. *A23K 1/146* (2013.01); *A23K 1/1813* (2013.01); *A23K 3/00* (2013.01); *A23L 1/09* (2013.01); *C13B 10/083* (2013.01)

(58) Field of Classification Search
CPC ................................ C13B 5/06; C13B 30/002
USPC ............................................................ 426/52
See application file for complete search history.

(56) References Cited

U.S. PATENT DOCUMENTS

| | | | | |
|---|---|---|---|---|
| 1,775,966 A | * | 9/1930 | Hamilton et al. | 426/655 |
| 2,492,667 A | * | 12/1949 | Snell et al. | 435/144 |
| 2,807,560 A | * | 9/1957 | Brownell et al. | 127/43 |
| 3,113,044 A | | 12/1963 | Alston | |
| 3,904,768 A | * | 9/1975 | Hruby | 426/53 |
| 4,794,013 A | * | 12/1988 | Gresch | 426/489 |
| 5,112,638 A | * | 5/1992 | Cagley et al. | 426/640 |
| 5,281,279 A | * | 1/1994 | Gil et al. | 127/46.1 |

(Continued)

FOREIGN PATENT DOCUMENTS

| DE | 77408 | * 7/1969 |
|---|---|---|
| EP | 0062290 | 10/1982 |

(Continued)

OTHER PUBLICATIONS

Baranovskii et al. RU 2058993 Derwent Abstract 2 pages.*

(Continued)

*Primary Examiner* — Felicia King
(74) *Attorney, Agent, or Firm* — Vedder Price P.C.; Thomas J. Kowalski; Rebecca G. Rudich

(57) ABSTRACT

A beet processing process including the step of washing of the beets and the step of partial pressing of the beets for the production, on the one hand, of a press cake containing more than 20% sugar relative to the dry matter content and, on the other hand, of a sugar juice at a concentration greater than 15% dry matter content. The process further includes the step of separation of the press cake and of the sugar juice.

18 Claims, 4 Drawing Sheets

(56) References Cited

U.S. PATENT DOCUMENTS

| | | | |
|---|---|---|---|
| 5,480,490 | A | 1/1996 | Toth et al. |
| 5,759,283 | A | 6/1998 | Ekern et al. |
| 6,440,222 | B1 | 8/2002 | Donovan et al. |
| 6,508,886 | B1 | 1/2003 | Ciaralli et al. |
| 2001/0054420 | A1* | 12/2001 | Reisig et al. .................... 127/55 |
| 2003/0040489 | A1* | 2/2003 | Tanaka et al. ................... 514/23 |
| 2005/0271770 | A1* | 12/2005 | Hughes ........................... 426/49 |
| 2007/0244719 | A1* | 10/2007 | David ............................... 705/2 |

FOREIGN PATENT DOCUMENTS

| | | |
|---|---|---|
| EP | 0259824 | 3/1988 |
| EP | 1 022 342 | 7/2000 |
| EP | 1 063 302 | 12/2000 |
| EP | 1788099 | 5/2007 |
| NL | 1013605 | 5/2001 |
| RU | 2 058 993 | 4/1996 |
| RU | 2 062 700 | 6/1996 |
| WO | WO 90/10719 | 9/1990 |

OTHER PUBLICATIONS

Robert Guyot (EP 10633302 Machine Translation) Dec. 27, 2000 9 pages.*

Search Report received in French Priority Application No. FR 0801496, dated Oct. 14, 2008.

* cited by examiner

BEET PROCESSING PROCESS AND UNIT

The present invention relates to a beet processing process and unit in order to produce expressed sugar juice and a beet press cake, also called product NA, which can be upgraded in various forms, in particular as animal feedingstuff, as fermentation substrate and as crystal sugar.

Currently, beets, containing of the order of 23% dry matter content, are processed according to the traditional sugar manufacturing diagram, illustrated in FIG. 1, to produce, on the one hand, sugar juice and, on the other hand, pulps.

The sugar beets are first washed and then chopped into cossettes before passing into an extractor having a large capacity in which hot water circulates countercurrentwise. A sufficiently long contact time is necessary for the sugar contained in the cossettes to pass into the water; this is known as diffusion. Once this step has been accomplished, two products come out: the beet pulps "which are depleted of sugar" and water loaded with sugar, also called diffusion juice which will need to be purified according to the lime-carbon separation process, concentrated in order to obtain a syrup and crystallized in order to obtain crystal sugar. The latter three steps are optional for the use of the diffusion juice in fermentation.

Because of their low sugar content, the pulps thus obtained cannot be upgraded in industrial fermentation, and are solely used as animal feed in three main forms:
wet pulps: about 11% dry matter content;
overpressed pulps: about 27% dry matter content;
dry pulps: about 88% dry matter content.

The wet pulps are directly obtained from diffusion. Because of their low dry matter content (11%), their value is reduced as animal feedingstuff. Indeed, the cost of transportation is high and the legislation requires animal breeders, for this type of product having a low dry matter content, to have available pits for recovering the juice derived from the flow of the product (silage) contained in these silos. This involves investments which are generally expensive and difficult to pay off in the light of the product.

Accordingly, the use of overpressed pulps having a higher dry matter content has developed in breeding.

Its use is very widespread in dairy farming (dairy cows) and beef cattle in the vicinity of sugar factories. Animal breeders constitute large silos of overpressed pulps for the three months of operation of the sugar factory, corresponding to the beet harvesting period, which can then be given throughout the year to their animals.

Precautions are necessary for the preparation of these silages; ensiled overpressed pulps have indeed had, in particular in dairy production, a bad image linked to the development of butyric acid bacteria spores. These butyric acid bacteria spores which also originate from the incorporation of soil into the silage by the tires of the machines used for packing the silos will contaminate the cow udder before contaminating the milk, thereby reducing its quality and therefore the price paid to the producer.

The advantages of dietary overpressed pulp are certainly numerous in animal breeding:
high digestibility by virtue of its moderately lignified walls;
good energy value;
supply of essential amino acids such as lysine and threonine;
galactogenic effect demonstrated by several studies.
Its use nevertheless requires a few recommendations:
limit the quantities ingested because of the high laxative effect;
be careful with the preservation of the overpressed beet pulps in the form of silage for preservation over several months.

The principle of ensilage is simple; it involves keeping the product protected from air so as to promote the rapid development of lactic acid bacteria. Using the soluble sugars contained in the ensiled product as nutrient, lactic acid bacteria develop and very rapidly acidify the medium, reducing the pH to a value in the region of 4. As long as air does not infiltrate, this acidity stabilizes the silo by limiting the development of microorganisms, including in particular butyric acid bacteria spores and coliforms. The ensiled product thus preserves its dietary value and its palatability for several months.

The overpressed pulps must be received by the animal breeder and rapidly placed in a silo. They must be spread in successive layers on a slab and packed. The silo must be rapidly sealed. This will then allow rapid acidification of the silo by the production of lactic acid. This acidification will then constitute a barrier to the development of butyric acid bacteria spores and of coliforms which are harmful for the preservation of the product.

In this context, the current optimized beet sugar manufacturing scheme for extracting the maximum amount of sugar from beet cossettes has several specific features:
the chopping of the washed beets into cossettes having a crest shape in order to avoid the pieces sticking together in the diffuser (the cossettes measure about 0.9 to 1.3 millimeters in thickness and from 5 to 6 centimeters in length);
a long treatment between the chopping of the beets and the exit of the pulps linked to the time required to allow the diffusion of sugar in water;
a high treatment temperature in order to optimize this diffusion;
overpressed pulps produced having a low sugar content (7% on a dry matter basis);
a dilute diffusion juice (about 15% dry matter content).
The main disadvantages of this technique are:
a rapid degradative oxidation of the cossettes immediately after they have been chopped;
a partial degradation of the beet dry matter content by fermentation during diffusion because of the duration and the temperatures in an aqueous phase;
overpressed pulps which are hardly fermentable because of their low sugar content and because they are hot, making their storage by ensilage difficult;
the overpressed pulps, which are hot on leaving the factory, cool too slowly in the silos, promoting the development of pectinolytic bacteria which degrade the pectin present in the pulps, reducing palatability for the animals;
a diffusion juice which is dilute (at about 15% dry matter content) and hot, easily degraded by fermentation;
the diffusion takes place in large exchangers which present a high industrial risk;
to allow its concentration and then optionally its crystallization, the dilute diffusion juice should undergo a lime-carbon treatment which is complex and costly in terms of energy, consisting first of all of a treatment with lime which precipitates a number of impurities and then of two successive carbonations which precipitate the excess lime with the aid of carbon dioxide.

The prior art discloses various processes for the extraction of a sugar juice for the production of sugar. Accordingly, the document NL-C2-1014605 describes a pressing of whole or chopped beets, it being possible for the pressed beets to be upgraded as feed in animal nutrition and the sugar juice being intended for the production of sugar. The document EP 1063605 describes a process comprising solely two extraction steps by pressing a mixture comprising fresh grated beet and a sugar juice additive. The document EP 1022342 describes a process for extracting a sugar juice comprising a multitude of pressing and extraction steps. The document DATABASE WPI Week 199711 Thomson Scientific, London, GB; AN1997-117132 XP002499480 & RU 2 062 700, and the document DATABASE WPI Week 199704 Thomson Scientific, London, GB; AN1997-041286 XP002499481 & RU 2 058 993 describe beet pressing for the production of a sugar juice. These various processing processes lead to the production, on the one hand, of beet pulps having a low sugar content and, on the other hand, of a dilute sugar juice. Such beet pulps are hardly fermentable and, consequently, are difficult to preserve in silos. The processes used are additionally substantial to a greater or lesser degree and require cumbersome and expensive plants, thereby increasing the cost of the products after processing.

The present invention makes it possible to overcome the existing disadvantages and provides, for that, a process for processing beets which considerably simplifies the plant and offers a better exploitation of the products obtained after processing. In addition, the aim of the present invention is to improve the preservation in silos of the pressed beet cakes or their direct use for its exploitation as animal feeding stuff and/or fermentation substrate, and the optional secondary processing of the sugar juice for its exploitation as animal feedingstuff, fermentation substrate or crystal sugar.

Accordingly, the invention relates to a beet processing process comprising at least the following steps:
washing of the beets;
partial pressing of the beets for the production, on the one hand, of a press cake containing more than 20% sugar relative to the dry matter content and, on the other hand, of a sugar juice at a concentration greater than 15% dry matter content;
separation of the press cake and of the sugar juice.

The processing process may additionally comprise, between the washing and pressing step, a step for chopping the beets.

The short time and a reduced temperature during pressing of whole or chopped beets on a line, compared with traditional diffusion conditions, limit the losses through degradation of the dry matter content linked to fermentation both in the press cake and in the sugar juice. In addition, the beet press cake which, unlike the pulps, is at a lower temperature and contains a large quantity of sugars, namely more than 20% dry matter content compared with 7% for the overpressed pulps, promotes, under anaerobic conditions, the rapid development of lactic acid bacteria. This rapid development is favorable to good preservation of the press cake in a silo. Moreover, the sugar fraction not used by these lactic acid bacteria will be upgraded during ruminal fermentation. Likewise, by virtue of its high sugar content, the beet press cake may be used as industrial fermentation substrate.

According to the process which is the subject of the invention, the expressed juice will be continuously treated more rapidly than the conventional sugar manufacturing process, thus limiting its degradation by fermentation.

According to one embodiment, the process comprises, between the washing step and the pressing step, a step of heating the whole or chopped beets. In addition, the process comprises a step of continuously filtering the sugar juice by centrifugation for the production, on the one hand, of a filter cake and, on the other hand, of a filtered sugar juice. Preferably, according to this first mode, the filter cake is then mixed with the press cake. Likewise, a step is performed for treating the filtered sugar juice by evaporation for the production of a concentrated filtered sugar juice syrup at more than 60% dry matter content and having a purity of close to 90% (sugar to dry matter ratio). This treatment step makes it possible to obtain a filtered sugar juice syrup capable of being preserved and handled.

According to a second embodiment, the process comprises the following steps:
mixing of a small percentage of flocculent, of the order of 1%, with the sugar juice obtained after pressing of whole or chopped beets;
optional mixing of a small percentage of flocculent, of the order of 1%, with the filtered sugar juice obtained after centrifugation of the juice obtained after pressing of whole or chopped beets;
membrane filtration of said mixture for the production of a retentate and a permeate, said permeate providing the filtered sugar juice syrup having a purity of at least 93%, more particularly intended for the production of crystal sugar.

Preferably, according to this second mode, the retentate is mixed with the press cake or with the filter and press cakes.

The invention also relates to a process for preserving the press cake, optionally mixed with the filter cake obtained according to one of the two embodiments and/or with the retentate obtained according to the second embodiment. The preservation process comprises a step of ensiling the press cake or the mixture, without packing said press cake or said mixture in the silo. This has the advantage of eliminating any packing necessary when the overpressed beet pulps are put in a silo in order to drive out the air present in said silo. Indeed, according to the invention, the press cake or the mixture allows natural packing thereof during the placing in a silo which, in combination with the percentage of sugar in said press cake or mixture, is sufficient for the development of lactic acid bacteria which make it possible to reduce the pH below 4. The preservation process is thus considerably simplified by eliminating the packing, thereby reducing the contamination of the silage caused by butyric acid bacteria spores which also originate from the incorporation of soil into the silage by the tires of the machines used for packing the silos.

The processing process may additionally comprise a final step of drying the press cake, optionally mixed with the filter cake obtained according to one of the two embodiments and/or with the retentate obtained according to the second embodiment.

The invention also relates to animal feedingstuffs based on press cake or a mixture preserved according to the preservation process which is the subject of the present invention, or even based on filtered sugar juice syrup having a purity of about 90% and more than 60% dry matter content obtained according to the processing process according to the first embodiment.

The invention also relates to industrial substrates for fermentation based on press cake or the mixture obtained according to the processing process which is the subject of the present invention, or even based on filtered sugar juice syrup having a purity of about 90% and more than 60% dry matter content, obtained according to the processing process according to the first embodiment.

The invention also relates to animal feedingstuffs based on press cake or a mixture preserved according to the preservation process which is the subject of the present invention, or even based on filtered sugar juice syrup having a purity of about 93%, obtained according to the processing process according to the second embodiment.

The invention also relates to industrial substrates for fermentation based on press cake or the mixture obtained according to the processing process which is the subject of the present invention, or even based on filtered sugar juice syrup having a purity of about 93%, obtained according to the processing process according to the second embodiment.

The invention also relates to edible sugar obtained by crystallization of the filtered sugar juice syrup having a purity of about 93% obtained according to the processing process according to the second embodiment.

The invention also relates to a plant for carrying out the beet processing process which is the subject of the present invention, allowing the production of a beet press cake and of a beet sugar juice. This plant comprises in particular a beet washing unit, a pressing unit, of the screw or twin-screw press type arranged to carry out partial pressing of the beets for the production, on the one hand, of a sugar-containing press cake at more than 20% relative to the dry matter content and, on the other hand, of a sugar juice at a concentration greater than 15% dry matter content. The pressing unit also comprises means for separating the press cake and the sugar juice obtained after pressing the beets.

For the implementation of the first embodiment of the processing process, the plant additionally comprises a unit for heating whole or chopped beets, preferably of the steam cooker type at 100° C., and a centrifuge for the filtration of the pressed beet sugar juice allowing the production of a filter cake and a filtered sugar juice.

For the implementation of the second embodiment of the processing process, the plant additionally comprises a unit for supplying a flocculent into the pressed beet sugar juice or into the beet sugar juice filtered by centrifugation and a membrane filtration unit, preferably of the inorganic membrane type with a porosity of the order of 0.14 to 0.20 nm, allowing the production of a filtered sugar juice syrup having a purity of at least 93%.

The characteristics and advantages of the present invention will emerge on reading the following description based on figures among which:

FIG. 1 schematically represents a traditional plant known in the state of the art;

FIGS. 2 and 3 schematically represent two plants for carrying out the beet processing process according to the abovementioned two embodiments, depending on the type of sugar juice desired;

Figure 6:
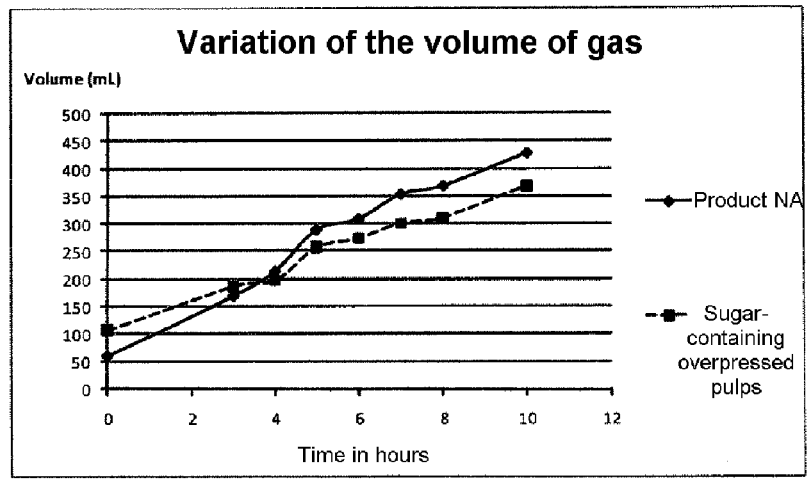
Figure 7:
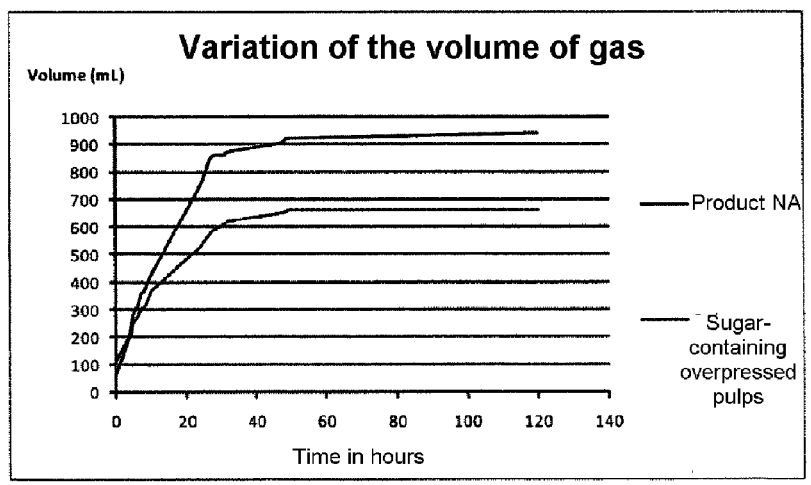

FIGS. 6 and 7 illustrate diagrams obtained during a comparative study of the variation of the total production of gas representative of the fermentative capacity in the rumen of an animal for animal feedingstuffs based on press cake or a mixture of said press cake with filter cake or retentate and the same animal feedingstuff in which said press cake or said mixture has been replaced with sugar-containing overpressed pulp.

Figure 1:
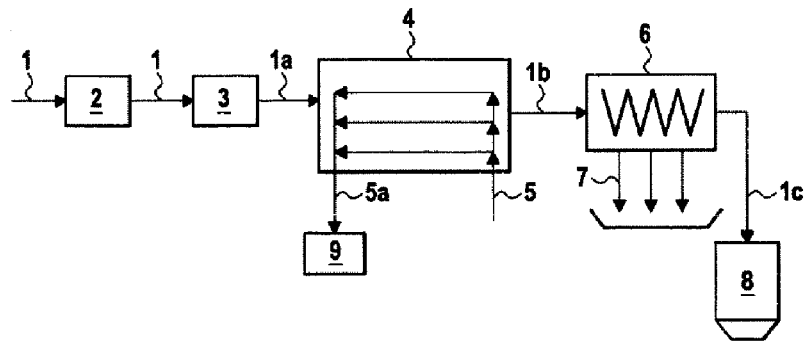

Traditional processes, known to persons skilled in the art, consist in carrying out the steps according to the diagram of FIG. 1. The beets 1 are first of all washed in a washing unit 2 and chopped into cossettes 1a in a chopping unit 3. The cossettes 1a then enter an extractor 4 in which hot water 5 circulates countercurrentwise, allowing the diffusion of the sugar present in the cossettes, in hot water. Beet pulps 1b depleted of sugar result therefrom and are then pressed in a pressing unit 6 to extract the remaining moisture 7 therefrom and to obtain at the outlet overpressed pulps 1c which are then preserved in silos 8. In parallel, the diffusion juice 5a loaded with sugar at the outlet of the extractor 4 is purified by a complex lime-carbon treatment and then concentrated and crystallized in one or more treatment units 9. The abovementioned effects or disadvantages result therefrom.

Figure 2:
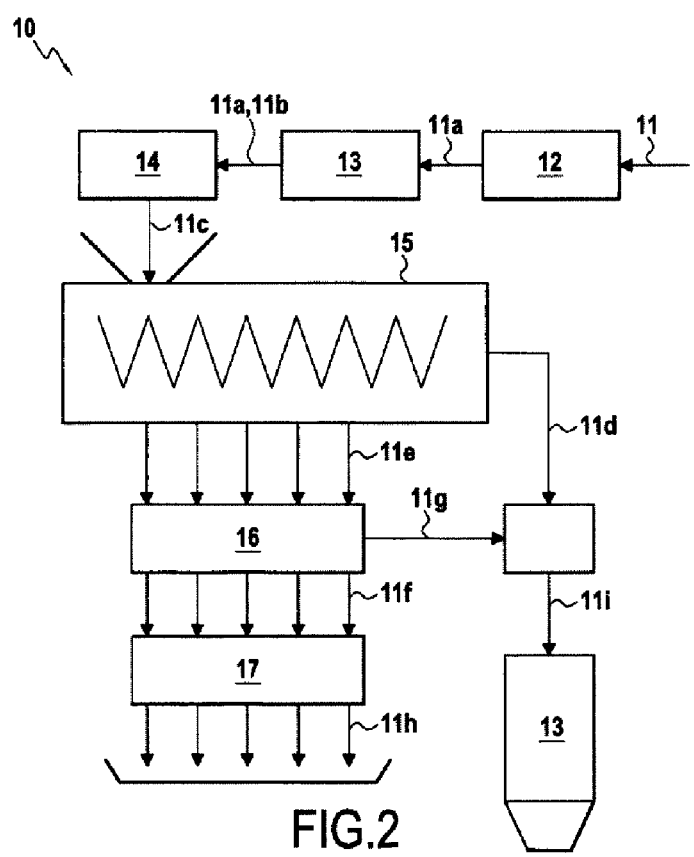
Figure 3:
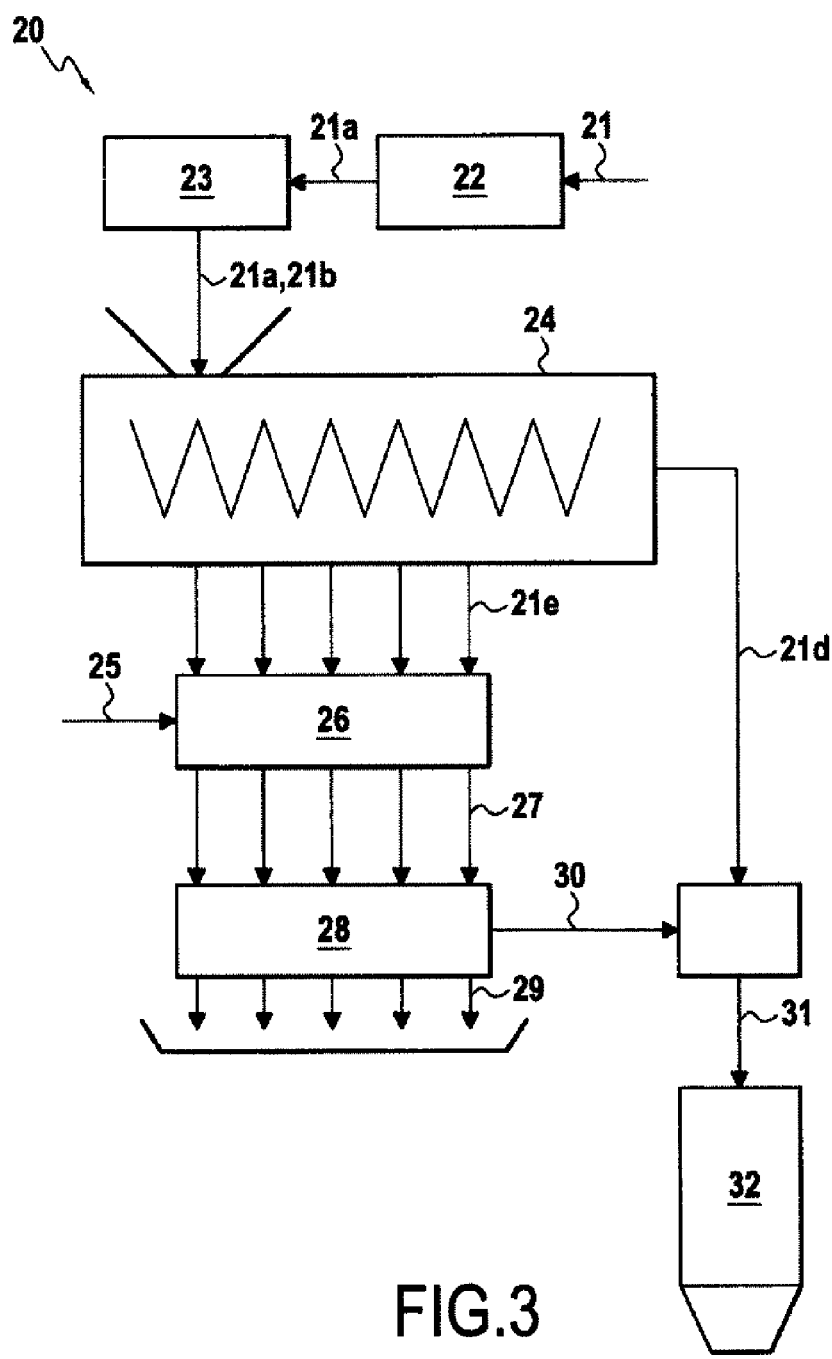

According to the first embodiment and the second embodiment of the invention illustrated in FIGS. 2 and 3, respectively, the beet processing process at least allows the production of two basic products, namely, on the one hand, a press cake containing more than 20% sugar relative to the dry matter content and, on the other hand, a sugar juice at a concentration greater than 15% dry matter content.

According to the first embodiment illustrated in FIG. 2, the plant 10 for carrying out the beet processing process additionally makes it possible to arrive at two final products, namely, on the one hand, a mixture of press cake and filter cake and, on the other hand, a filtered sugar juice syrup having a purity of about 90% and more than 60% dry matter content, having a brown color. As schematically represented in FIG. 2, the beets 11 enter a washing unit 12. These washed beets 11a are optionally chopped in a chopping unit 13. Preferably, the whole 11a or chopped 11b washed beets are then heated in a heating unit 14, consisting for example of a steam cooker at 100° C. The heated 11c whole or chopped beets then enter a pressing unit 15, for example a twin-screw press known to a person skilled in the art, which carries out a partial pressing so as to obtain at the outlet two separate products: on the one hand, a beet press cake 11d containing more than 20% sugar relative to the dry matter content and, on the other hand, a beet sugar juice 11e at a concentration greater than 15% dry matter content. The sugar juice 11e is then filtered by means of a centrifuge 16, for example of the Guinard® type, allowing the production of two products, namely a filtered sugar juice 11f and a filter cake 11g. The filtered sugar juice 11f is then concentrated by means of a vacuum evaporator 17 which makes it possible to obtain a filtered sugar juice syrup 11h having a purity of about 90% and more than 60% dry matter content. The filter cake 11g is, for its part, preferably mixed with the press cake 11d, said mixture 11i then being preserved dry or as it is in silos 18.

According to the second embodiment illustrated in FIG. 3, the plant 20 for carrying out the beet processing process additionally makes it possible to arrive at two final products, namely, on the one hand, a mixture of press cake and of retentate or a mixture of press cake, filter cake and retentate and, on the other hand, a filtered sugar juice syrup having a purity greater than 93%, having a straw color. As schematically represented in FIG. 3, the beets 21 enter a washing unit 22. These washed beets 21a are optionally chopped in a chopping unit 23. The whole 21a or chopped 21b beets then enter a pressing unit 24, for example a screw press known to persons skilled in the art, so as to obtain two separate products at the outlet: on the one hand, a beet press cake 21d containing more than 20% sugar relative to the dry matter content and, on the other hand, a beet sugar juice 21e at a concentration greater than 15% dry matter content. The sugar juice 21e is then optionally filtered by means of a centrifuge allowing the production of two products, on the one hand, a filter cake which may be reincorporated into the press cake and, on the other hand, a filtered sugar juice. Depending on the case, the sugar juice 21e or the filtered sugar juice will be mixed with flocculent 25, for example of the Sucrofloc® type, in a mixer 26, said mixture 27 obtained then being filtered by means of a membrane filtration unit 28, for example of the inorganic membrane type with a porosity between 0.14 and 0.20 nm, allowing the production of two products, namely a permeate 29 constituting a filtered sugar juice having a purity greater than 93% and a retentate 30. The filtered sugar juice having a higher purity is then concentrated, and then used in crystallization according to known techniques, as edible sugar. The retentate 30 is, for its part, preferably mixed with the press cake 21$d$, said mixture 31 then being preserved dried or as it is in silos 32.

The mixture 11$i$ of press cake 11$d$ with the filter cake 11$g$ and the mixture 31 of press cake 21$d$ with the retentate 30, or even the press cake 11$d$ or 21$d$ alone, preserved in the silos 18 or 32, are used either as component in animal feedingstuff or as fermentation substrate. The filtered sugar juice 11$h$ obtained according to the processing process illustrated in FIG. 2 is also used either as component in animal feedingstuff or as fermentation substrate.

The aim of the following description is to demonstrate the specific characteristics of the press cake 11$d$ or 21$d$, or even of the mixture 11$i$ or 30, named below product NA in which a large quantity of constitution sugar still remains, compared with overpressed pulps or sugar-containing overpressed pulps.

According to the invention, the processing process makes it possible to arrive at a product NA whose composition has the following analytical values (in % dry matter content DM) and nutritional values (per kg of dry matter content DM):

| Analytical values (in % DM): | |
|---|---|
| DM: | 30% |
| Crude proteins: | 7.3% |
| Fat: | 0.1% |
| Crude ash: | 9.0% |
| Sugars: | 30% |
| Crude cellulose: | 14.3% |
| Nutritional values (per kg of DM) | |
| Milk fodder unit (UFL): | 1.44 |
| Meat fodder unit (UFV): | 1.35 |
| Protein digestible in the intestine (PDIN): | 45 g/kg |
| Protein digestible in the intestine (PDIE): | 63 g/kg |
| Dietary digestible protein (PDIA): | 21 g/kg |

Where:

PDIN represents the quantity of proteins digestible in the intestine of a feed when it is included in a ration deficient in degradable nitrogen.

PDIE represents the quantity of proteins digestible in the intestine of a feed when it is included in a ration deficient in energy.

By comparison, the overpressed pulps from the traditional sugar manufacturing diagram illustrated in FIG. 1 have a dry matter content of about 27%. These overpressed pulps have a composition having the following analytical values and nutritional values:

| Analytical values (in % DM) | |
|---|---|
| DM: | 27% |
| Crude proteins: | 9.8% |
| Crude ash: | 9.0% |
| Sugars: | 7% |
| Crude cellulose: | 20.6% |
| Nutritional values (per kg of DM) | |
| UFL: | 1.01 |
| UFV: | 0.99 |
| PDIN: | 60 g/kg |

| | |
|---|---|
| PDIE: | 84 g/kg |
| PDIA: | 28 g/kg |

A second comparison was made with sugar-containing overpressed pulps. These sugar-containing overpressed pulps are a combination of overpressed pulps described above and of sugar syrup derived from the conventional sugar manufacturing process containing 87% of sugar on a dry matter basis. These two products were mixed in order to obtain a chemical composition similar to that of the product NA. These sugar-containing overpressed pulps have a composition having the following analytical values and nutritional values:

| Analytical values (in % DM) | |
|---|---|
| DM: | 30% |
| Crude proteins: | 7.3% |
| Fat: | 0.1% |
| Crude ash: | 9.0% |
| Sugars: | 30% |
| Crude cellulose: | 14.3% |
| Nutritional values (per kg of DM) | |
| UFL: | 1.44 |
| UFV: | 1.35 |
| PDIN: | 45 g/kg |
| PDIE: | 63 g/kg |
| PDIA: | 21 g/kg |

Trials for preservation of the product NA, of the overpressed pulps and of the sugar-containing overpressed pulps were carried out by the ensilage principle. The ensilage principle is placing the fresh product protected from air so as to allow the development of anaerobic lactic acid bacteria. To do this, the silage is generally packed in order to expel the maximum amount of oxygen. The rapid development of lactic acid bacteria results in a rapid increase in the acidity of the silage (decrease in pH).

A rapid acidification of the silo is essential in order to rapidly bring the pH to a value below 4. If this acidification is too slow, there is a risk of development of enterobacteria and butyric acid bacteria spores which will produce acetic acid and butyric acid responsible, on the one hand, for a loss of dry matter content of the silage and therefore of nutritional value and, on the other hand, for the nonpalatability of the silage: unpleasant odors and tastes.

Upon fermenting the soluble sugars contained in the silage, the lactic acid bacteria produce lactic acid, very rapidly acidify the medium and reduce the pH to a value below 4. At a pH below 4, the proteolysis (loss of proteins by fermentation) and the fermentations which produce volatile fatty acids in the ensiled fodder are stopped. The silage becomes stable and may be preserved under good conditions, making it capable of satisfying the dietary needs of the breeding.

The trials made it possible to measure the variation of the acidity (pH) of the silos of product NA.

Measurement of the pH of the product NA after it has been put in a silo:

| Number of days after ensiling | 1 | 2 | 3 | 4 | 5 | 6 | 7 | 8 | 9 | 18 | 31 |
|---|---|---|---|---|---|---|---|---|---|---|---|
| pH measured | 4.32 | 4.14 | 3.92 | 3.77 | 3.69 | 3.55 | 3.52 | 3.51 | 3.54 | 3.45 | 3.4 |

Figure 4:
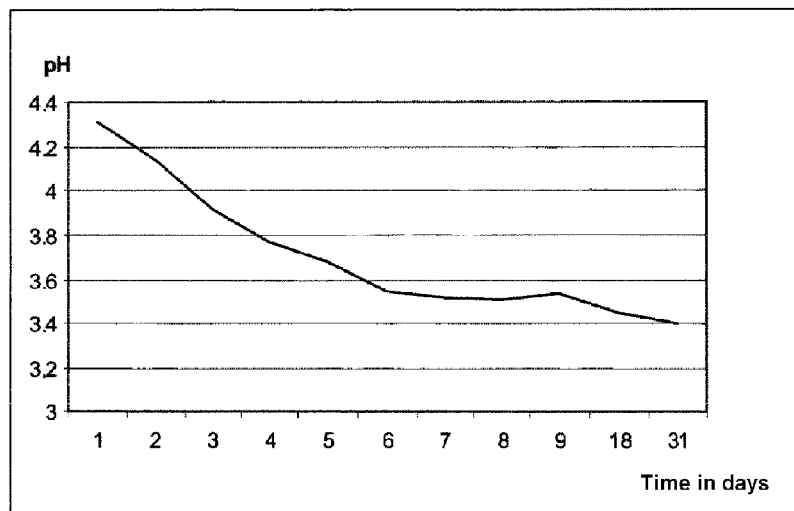
FIG. 4 illustrates a graph showing the variation of the acidity (pH) in the silos during the preservation of the press cake or of a mixture of said press cake with filter cake or retentate.

This makes it possible to arrive at the graph of FIG. 4 showing the variation of the acidity (pH) of the product NA preserved as silage. It is observed that the pH of the product NA becomes stabilized at about 3.4 after a period of preservation of 18 days.

A comparison with the overpressed pulps shows that they never reach such a low pH. After 32 days, the pH of the overpressed pulps, measured on 9 different silos, was only 3.9. Furthermore, after nearly 5 months, the pH of these silos of overpressed pulps was not less than 3.6.

In addition, the conditions for putting in the silo for the product NA are advantageous. Indeed, in order to promote the development of anaerobic lactic acid bacteria and therefore to promote the reduction in the pH of the silo, it is essential, with the overpressed pulps, to pack the ensiled product. Now, unlike the overpressed pulps on which the pH measurements were performed, the product NA was not packed during the constitution of the silo. Its acidification was nevertheless more rapid and reached an acidity level greater than that of the overpressed pulps. The fact that the product NA does not have to be packed represents a considerable time saving for farmers using the product NA and limits the risks of incorporation of soil into the silage and therefore its contamination with butyric acid bacteria spores.

Moreover, the freezing points differ between the product NA, the overpressed pulps and the sugar-containing overpressed pulps. The resistance of the product to freezing has several advantages:
- in the event of freezing of the silage, the breeder can no longer use it and can no longer distribute it to its animals;
- large frozen blocks of products may also be formed which can sometimes damage the equipment distributing the feed to the animals.

Figure 5:
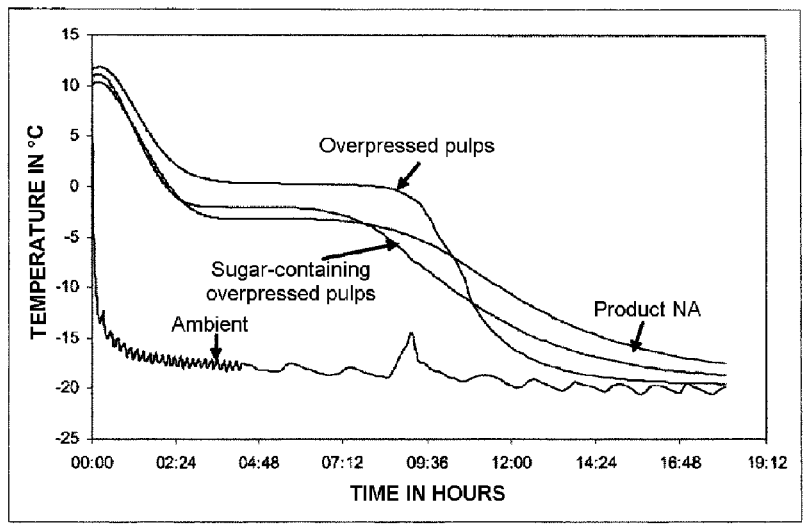
FIG. 5 illustrates the monitoring of the freezing of the press cake or of the mixture, compared with overpressed beet pulps and sugar-containing overpressed beet pulps.

Measurements of kinetics of freezing were carried out in order to compare the overpressed pulps, the product NA and the sugar-containing overpressed pulps. These measurements are illustrated on the graph of FIG. 5 which shows the monitoring of the freezing of the product NA compared with overpressed pulps and sugar-containing overpressed pulps. It appears that:
- the freezing plateaus for the sugar-containing overpressed pulps and for the product NA are reached at the same time. The overpressed pulp batch remains slower to reach this plateau;
- the overpressed pulp batch has a freezing plateau temperature which is markedly higher than the other two batches:
  - overpressed pulp batch: 0.2/0.3° C.;
  - sugar-containing overpressed pulp batch: −2° C.;
  - product NA batch: −3° C.;
- the sugar-containing overpressed pulp and product NA batches freeze more gently and have similar plateau times;
- on the other hand, the overpressed pulp batch is more heterogeneous, with a mean of 4 h 45 min compared to 3 h 40 min for the sugar-containing overpressed pulp batch and 4 h 30 min for the product NA batch.

In conclusion, a more rapid acidification of the silo of product NA than of the silos of overpressed pulps is thus observed. Furthermore, the pH for stabilizing the product NA is 3.4. The product NA can thus be preserved without developing a microflora that is undesirable for its preservation. In addition, this result may be obtained without the silo being packed, unlike overpressed pulps, which has certain advantages: reduced work constraints for the farmers and reduced risks of contamination of the silage by butyric acid bacteria spores.

The freezing plateau is reached later and is lower for the product NA compared with the overpressed pulps, which reflects its higher capacity to withstand freezing in comparison to the overpressed pulps. The sugar-containing overpressed pulps, for their part, follow a profile similar to that of the product NA up to the freezing plateau, after which the kinetics of freezing are more rapid than that of the product NA.

The measurements of the total production of gas on the product NA, the overpressed pulps and the sugar-containing overpressed pulps result in the graphs of FIGS. 6 and 7, showing a comparison of the total production of gas between a ration based on product NA and a ration based on sugar-containing overpressed pulps. These measurements of total production of gas for various rations for dairy cows were carried out in a fermenter using rumen juice.

According to a trial series, rations based on product NA and sugar-containing overpressed pulps are compared. Comparable trials were carried out with rations based on product NA and overpressed pulps and make it possible to arrive at similar conclusions. Only the first trials are developed below for that.

The objective is to compare two products, animal feedingstuff, having the same chemical composition: dry matter content, sugar content and the like, but obtained according to two different processes. Given that the theoretical nutritional values of the two products, the product NA and the sugar-containing overpressed pulps, were the same, we created a ration in which the product NA was replaced by the sugar-containing overpressed pulp.

| Crude quantity/animal/day | Ration 1 | Ration 2 |
|---|---|---|
| MAIZE SILAGE | 35 | 35 |
| SUGAR-CONTAINING OVERPRESSED PULPS | 10 | — |
| PRODUCT NA | — | 10 |
| NITROGEN REGULATOR | 3.7 | 3.7 |
| STRAW | 2 | 2 |

The measurement of the production of gas makes it possible to determine the fermentative capacity of the ration or of the feed tested. The greater the production of gas with the same nutritional balance (energy/nitrogen), the greater the upgrading of the ingested feed for the animal.

In comparison with sugar-containing overpressed pulps, the kinetics of fermentation and the total production of gas are higher with the product NA. This is shown in FIGS. 6 and 7.

In conclusion, the advantages generally provided by the product NA compared with the overpressed pulps and the sugar-containing overpressed pulps are observed.

The acidification of the silo of product NA is faster and greater than the overpressed pulps. The preservation of the product NA in the form of silage is therefore better than that of the overpressed pulps, and the nutritional qualities of the product NA are thus better preserved. Furthermore, putting the product NA in the silo does not require packing it, which constitutes a reduced constraint of work for agricultural users compared with overpressed pulps. This also makes it possible to reduce the contamination of the silage by butyric acid bacteria spores.

An increased production of gas was observed with the product NA rations compared with those containing sugar-containing overpressed pulps. This reflects better fermentation capacities in the rumen of the animal for the product NA and therefore a better upgrading of the feed by the animal in order to express all its zootechnical performances.

Finally, from a practical point of view, it was observed that the product NA only froze at a temperature below −3° C., whereas the overpressed pulps froze at around 0° C. The use and the distribution of the product NA to the animals are therefore facilitated during the winter period which will be the main period for distribution to the animals.

The invention claimed is:

1. A process, comprising at least the following sequence of steps consisting of:
    washing of beets;
    optional chopping and/or heating of the washed beets;
    partial pressing of the washed and optionally chopped and/or heated beets for the production, on the one hand, of a press cake of partially pressed beets containing more than 20% sugars relative to the dry matter content and, on the other hand, of a sugar juice at a concentration greater than 15% dry matter content;
    separating the press cake of partially pressed beets and the sugar juice;
    the partial pressing of the beets being the sole pressing step; and further comprising:
    1) either the sequence of steps consisting of:
        filtering the sugar juice by centrifugation for the production, on the one hand, of a centrifuge cake and, on the other hand, of a centrifuged sugar juice;
        mixing the centrifuge cake with the press cake of partially pressed beets containing more than 20% sugar relative to the dry matter content, so as to obtain a mixture of a press cake of partially pressed beets with a centrifuge cake, said mixture containing more than 20% sugar relative to the dry matter content,
    2) or the sequence of steps consisting of:
        mixing of a small percentage of flocculent, of the order of 1%, with the sugar juice so as to obtain a mixture of flocculent and sugar juice;
        membrane filtration of said mixture of flocculent and sugar juice for the production of a retentate and a permeate, said permeate providing a filtered sugar juice having a purity of at least 93%;
        and mixing the retentate with the press cake of partially pressed beets containing more than 20% sugar relative to the dry matter content, so as to obtain a mixture of a press cake of partially pressed beets with a retentate, said mixture containing more than 20% sugar relative to the dry matter content;
    3) or the sequence of steps consisting of:
        filtering the sugar juice by centrifugation for the production, on the one hand, of a centrifuge cake and, on the other hand, of a centrifuged sugar juice;
        mixing of a small percentage of flocculent, of the order of 1%, with the centrifuged sugar juice, so as to obtain a mixture of flocculent and sugar juice;
        membrane filtration of said mixture of flocculent and sugar juice for the production of a retentate and a permeate, said permeate providing a filtered sugar juice having a purity of at least 93%; and
        mixing the retentate with the press cake of partially pressed beets and with the centrifuge cake containing more than 20% sugar relative to the dry matter content so as to obtain a mixture of press cake of partially pressed beets with a centrifuge cake and a retentate, said mixture containing more than 20% sugar relative to the dry matter content,
    the thus obtained mixture of a press cake of partially pressed beets with a centrifuge cake and/or a retentate, which contains more than 20% sugar relative to the dry matter content, being an easily fermentable product.

2. The process as claimed in claim 1, according to which the centrifuged sugar juice has a purity of about 90%.

3. The process as claimed in claim 1, comprising a step for treating the centrifuged sugar juice by evaporation for the production of a centrifugated sugar juice syrup having a dry matter content greater than 60%.

4. A process for preserving a mixture of a press cake of partially pressed beets with a centrifuge cake and/or a retentate, comprising the steps of claim 1, and further comprising
    ensiling the obtained mixture of a press cake partially pressed beets with a centrifuge cade and/or a retentate, without packing said obtained mixture in the silo.

5. A process for preserving a mixture of a press cake of partially beets with a centrifuge cake and/or a retentate, comprising the steps of claim 1, and further comprising
    drying the obtained mixture of a press cake of partially pressed beets with a centrifuge cake and/or a retentate.

6. An animal feedingstuff comprising a mixture of a press cake of partially pressed beets with a centrifuge cake and/or a retentate obtained by the process of claim 1.

7. An animal feedingstuff comprising a mixture of a press cake of partially pressed beets with a centrifuge cake and/or a retentate preserved by the preservation process of claim 4.

8. An animal feedingstuff comprising a mixture of a press cake of partially pressed beets with a centrifuge cake and/or a retentate preserved by the preservation process of claim 5.

9. An animal feedingstuff comprising filtered sugar juice having a purity of at least 93% obtained by the process of claim 1.

10. An animal feedingstuff comprising centrifuged sugar juice having a purity of about 90% obtained by the process of claim 1.

11. An animal feedingstuff comprising centrifuged sugar juice syrup having a dry matter content greater than 60% obtained by the process of claim 3.

12. A fermentation substrate comprising a mixture of a press cake of partially pressed beets with a centrifuge cake and/or a retentate obtained by the process of claim 1.

13. A fermentation substrate comprising a mixture of a press cake of partially pressed beets with a centrifuge cake and/or a retentate preserved by the preservation process of claim 4.

14. A fermentation substrate comprising a mixture of a press cake of partially pressed beets with a centrifuge cake and/or a retentate preserved by the preservation process of claim 5.

15. A fermentation substrate comprising filtered sugar juice having a purity of about 93% obtained by the process of claim 1.

16. A fermentation substrate comprising centrifuged sugar juice having a purity of about 90% obtained by according to the process of claim 1.

17. A fermentation substrate comprising centrifuged sugar juice syrup having a dry matter content greater than 60% obtained by the process of claim 3.

18. An edible sugar obtained by crystallization of filtered sugar juice syrup having a purity of 93% obtained by the process of claim 1.

* * * * *

UNITED STATES PATENT AND TRADEMARK OFFICE
CERTIFICATE OF CORRECTION

PATENT NO. : 9,326,534 B2
APPLICATION NO. : 12/933102
DATED : May 3, 2016
INVENTOR(S) : Jean-Benoit Tierny It is certified that error appears in the above-identified patent and that said Letters Patent is hereby corrected as shown below:

TITLE PAGE

Item (73) Assignee:

Please change "Lesaffre Et Comopagnie" to --LeSaffre et Compagnie--

Signed and Sealed this
Fifth Day of July, 2016

Michelle K. Lee
*Director of the United States Patent and Trademark Office*